WILLIAM JUBY COLEMAN, OF BURY ST. EDMUNDS, AND ALFRED COLEMAN, OF LONDON, ENGLAND.

Letters Patent No. 85,070, dated December 22, 1868; patented in England, November 19, 1867.

IMPROVED ARTICLE OF FOOD.

The Schedule referred to in these Letters Patent and making part of the same.

*To all to whom it may concern:*

Be it known that we, WILLIAM JUBY COLEMAN of Bury St. Edmunds, in the county of Suffolk, England, and ALFRED COLEMAN, of Lombard street, in the city of London, England, subjects of the Queen of Great Britain, have invented or discovered new and useful "Improvements in the Combination and Mode of Treating and Employing Certain Preparations for Various Articles of Food;" and we, the said WILLIAM JUBY COLEMAN and ALFRED COLEMAN, do hereby declare the nature of the said invention, and in what manner the same is to be performed, to be particularly described and ascertained in and by the following statement thereof; that is to say—

At the present time an extract of meat is largely prepared, in countries where meat is cheap, by a process known as "Liebig's process," and which consists essentially in dissolving out from finely-divided flesh, free from fat, all that is soluble in water, by boiling for a short time, and then, having strained the solution, evaporating it at a low temperature until a semi-solid mass is obtained. The extract so made contains, in a very portable form, the more nutritious parts of the meat.

Up to this time, when required for use, it has been common to mix this extract with water, by which means a soup is obtained.

The object of our invention is to employ this extract more advantageously than heretofore, in the manufacture of solid articles of food, in the nature of biscuits and lozenges, and consists in compounding the extract of meat, as is hereinafter described, with farinaceous materials, that is to say, with the flour of wheat or other grain, either previously cooked, or otherwise, and then rolling or passing the mixture together, so as to form sheets or thin pieces, which are then dried or baked; and In order that our said invention may be most fully understood, and readily carried into effect, we will proceed to describe in detail the processes which we prefer.

In preparing lozenges with Liebig's extract of meat, we first make a biscuit with the following materials:
Flour, fifteen pounds.
Butter, two pounds.
Coleman's Warwickshire sauce, one-half pound.
Sugar, two ounces.
Carbonate of soda, one-half ounce.

We mix these materials with water, so as to make a dough, which we roll out and bake into biscuits in the usual way. We grind these biscuits to a fine powder, and we mix well together four parts of the biscuit-powder and one part of powdered gum-acacia, and we pass the mixture through a fine sieve. We then thoroughly incorporate with it two parts of the extract of meat, and a little water, just sufficient to make the ingredients adhere. We then roll out the compound into a thin sheet, and, having cut it into disks of convenient size, we dry the disks at a temperature of 150° Fahrenheit, or thereabouts.

The lozenges thus made may be preserved in close cases, so as to prevent them from gathering moisture from the air, or they may, with the same object, be coated with gelatine. This may be done by dipping them into a strong solution of gelatine, kept at a temperature of 180°. The solution should be about as thick as treacle. The lozenges are stuck on needle-points, arranged in a frame. They are dipped into the solution, and afterwards the frame is moved about by hand, to distribute the gelatine on the lozenges, as it sets.

In making biscuits, we prefer to proceed as follows:

We mix together the following ingredients—flour, fifteen pounds; butter, two pounds; Liebig's extract of meat, one pound; Coleman's Warwickshire sauce, one-half pound; white sugar, two ounces; and carbonate of soda, one-half ounce—with water sufficient to make a dough. From this dough we cut out the biscuits, and we bake them in an oven, the temperature of which can be accurately regulated. We use a hot-water oven, and we keep the temperature between 350° and 400° Fahrenheit. We bake from twenty to twenty-five minutes. These biscuits should be kept in air-tight cases.

We make a food for invalids by grinding the biscuits to a coarse powder.

When preparing biscuits to be ground as a food for invalids, the sauce should be omitted.

Having thus described the nature of our invention, and the manner of performing the same, we would have it understood that

What we claim, is—

The manufacture of biscuits, lozenges, and similar articles of food, by compounding Liebig's extract of meat with farinaceous materials, then rolling or pressing the mixture together, so as to form sheets or thin pieces, and drying or baking the same.

WM. J. COLEMAN.
ALFRED COLEMAN.

Witnesses:
G. F. WARREN, } *Both of No. 17 Gracechurch*
THOS. BROWN, } *Street, London.*